United States Patent [19]
Bernard

[11] Patent Number: 5,592,330
[45] Date of Patent: Jan. 7, 1997

[54] RETROREFLECTIVE PRISM ARRAYS WITH FORMED AIR SPHERES THEREIN

[75] Inventor: Gus Bernard, West Hartford, Conn.

[73] Assignee: Reflexite Corporation, Avon, Conn.

[21] Appl. No.: 444,551

[22] Filed: May 19, 1995

[51] Int. Cl.⁶ .................................................. G02B 5/124
[52] U.S. Cl. ........................ 359/529; 359/519; 359/530; 156/242; 156/324; 428/913; 264/214
[58] Field of Search .................................. 359/515–519, 359/529–534; 264/1.9, 214, 219–220; 156/60, 71, 150–151, 166, 181, 184, 230–243, 278, 324; 427/383.1, 584, 162, 163.4; 428/178, 332, 337, 913; 404/12, 16; 116/63 R, 63 P, 63 C, 63 T

[56] References Cited

U.S. PATENT DOCUMENTS

| | | | |
|---|---|---|---|
| 3,124,639 | 3/1964 | Kahn | 88/65 |
| 3,689,346 | 9/1972 | Rowland | 156/245 |
| 3,772,128 | 11/1973 | Kahn et al. | 156/555 |
| 3,829,680 | 8/1974 | Jones | 240/106 |
| 3,935,359 | 1/1976 | Rowland | 359/530 |
| 3,945,722 | 3/1976 | Prueitt | 353/122 |
| 4,572,622 | 2/1986 | Sterner | |
| 4,701,772 | 10/1987 | Anderson et al. | 346/160 |
| 4,796,160 | 1/1989 | Kahn | 362/19 |
| 5,485,311 | 1/1996 | McAllister | 359/530 |

*Primary Examiner*—James Phan
*Attorney, Agent, or Firm*—Hamilton, Brook, Smith & Reynolds, P.C.

[57] ABSTRACT

A method and apparatus for forming retroreflective sheeting with improved daytime whiteness performance is described in which air spheres are encapsulated into the prism structure when the prism base body is laminated to the prisms in a mold.

16 Claims, 2 Drawing Sheets

RETROREFLECTIVE PRISM ARRAYS WITH FORMED AIR SPHERES THEREIN

BACKGROUND OF THE INVENTION

This invention relates to the formation of retroreflective microprisms in the form of small, closely packed, cube corner formations in the order of 0.025 inches, or less, in side edge dimensions. Such prisms have found many applications as retroreflective sheeting employed as safety reflective lighting devices on vehicles or clothing and in retroreflective highway signs. (See, for example, U.S. Pat. No. 3,689,356 to W. P. Rowland issued Sep. 5, 1972 and incorporated in its entirety by reference herein.)

SUMMARY OF THE INVENTION

Retroreflective sheeting is formed in accordance with the invention having air spheres incorporated into the prism structure during the process of attaching the prisms to the sheeting base body. One way of accomplishing this is to only partially fill prism mold recesses with prism material, leaving an air gap. When the base body is laminated onto the mold material and the mold material cured, the air in the recesses is entrapped in the prism body leaving air pockets in the shape of bubbles or spheres randomly distributed throughout the otherwise solid prisms.

As will be explained in some detail, the air bubbles redirect or scatter some of the incident light rays in a manner such that the material will have a whiter (High Cap Y) appearance when viewed from various angles. Some light rays will be redirected in a manner which scatters the light. Other rays will be retroreflected in a narrow beam.

DETAILED DESCRIPTION OF THE INVENTION

Figure 1:
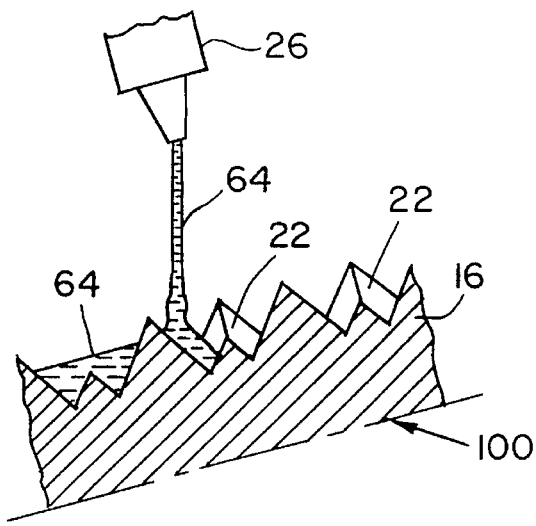
FIG. 1 is a fragmentary sectional view taken at location about a drum axis of a mold illustrating the deposition of liquid prism molding material thereunto from a coating head mounted thereabove.
Figure 3:
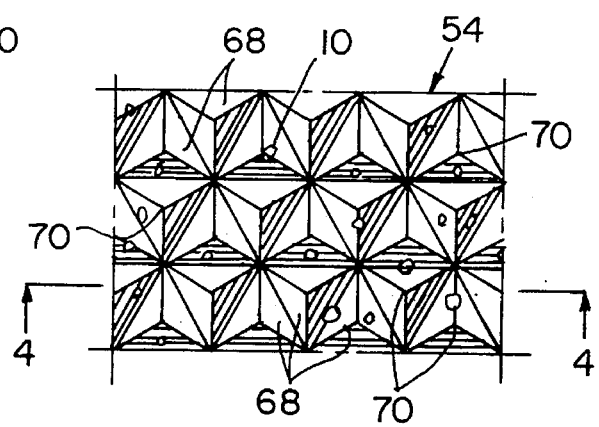
FIG. 3 is a fragmentary view of the rear surface of reflective sheeting produced in accordance with the present invention.
Figure 2:
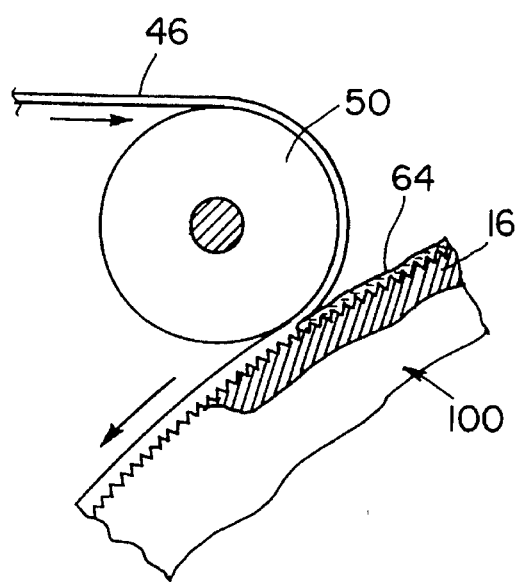
FIG. 2 is a fragmentary section to an enlarged scale of the apparatus for applying a film of base material 46 by a roller 50 to the prism material 64 in the mold 16 to entrap air bubbles in the prisms 68.
Figure 4:
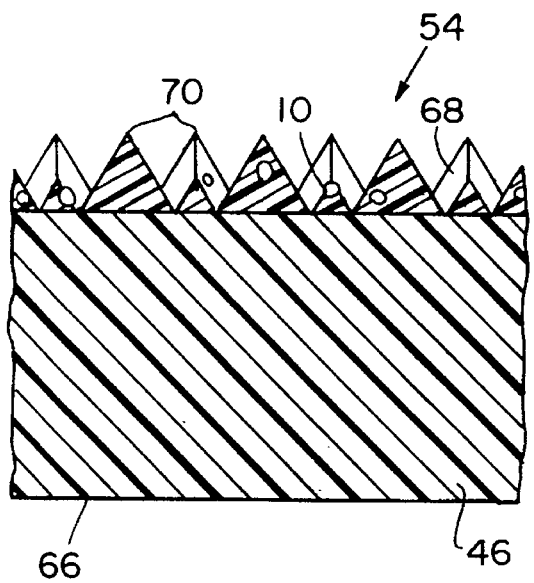
FIG. 4 is a fragmentary sectional view to an enlarged scale taken along the lines 4—4 of FIG. 3.

Referring now to FIGS. 1–7, the invention will now be described in detail in connection therewith. Since much of the apparatus and processes used in connection with manufacturing the embodiments herein has been previously described in connection with the above-referenced U.S. Pat. No. 3,689,356, these details will not be repeated here except where needed for a proper understanding of the present invention.

The apparatus of the invention includes a molding drum 100 mounted upon an axle or shaft for rotation in the direction indicated by the arrow (i.e., counterclockwise). The circumferential portion of the drum 100 consists of a multiplicity of metallic plates 16 bonded to a circumferential base portion. Each of the plates 16 is formed with a multiplicity of identical, contiguously arranged cube-corner recesses or indentations 22, and the plates 16 are provided entirely about the circumference of the drum 100 to provide a molding surface that has a substantially continuous array of cube-corner recesses 22 therein.

A coating head 26 is mounted about the drum 100 at one point about its circumstance for reciprocal movement thereacross. As the drum continuously rotates, a hardenable molding material 64 in fluid form is deposited thereupon from the coating head 26. Film 46 is continuously withdrawn from a feed reel (not shown) and applied against the drum 100 by the pressure roll 50, which cooperates with the drum 100 to provide a nip at which the hardenable material 64 is uniformly distributed over the surface of the mold plates 16, and at which intimate contact is effected between the material 64 and the film 46.

We have found that air spheres 10 can be introduced into the retroreflecting microprisms 70 (FIGS. 3–6) formed at this point in the process by the simple expedient of eliminating the customary step of pre-wetting the mold surface. The viscosity of the prism material 64 is such that, without the use of a wetting agent, the prism cavities 22 will not be completely filled. Air spheres 10 of various sizes are therefore entrapped in the prism bodies 70 when contact is made between the material 64 and the film 46.

The freshly applied material 64 and film 46 travel together past a bank of radiating elements (not shown) whereat hardening of the material 64 and bonding thereof to the film 46 are concurrently effected. Thereafter, a cooling medium permanently sets the material 64 which now is bonded to the film 46 so that the completed reflective sheeting 54 can be readily stripped from the drum 100 about a roll and wound upon a take-up reel.

The number of air spheres 10 created is dependent on the process drum speed, drum temperature and the viscosity of the prism material. It is believed that the laminating roll diameter and durometer of the roll material will also influence the number of air spheres created.

The location of the air spheres 10 within the individual prisms 70 and the location of the air spheres across the film appears to be random in nature.

Figure 5:
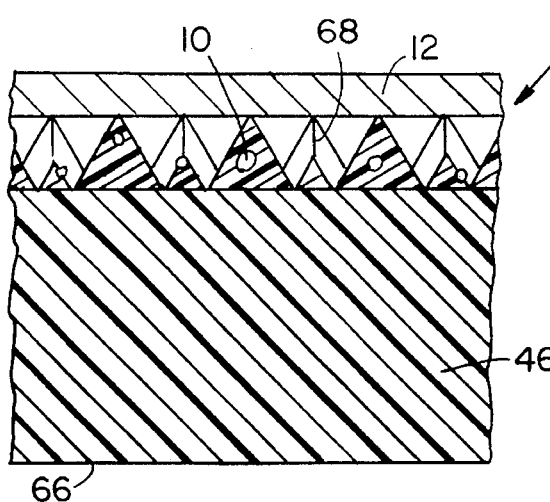
FIG. 5 is a view as in FIG. 4 with a white backing layer 12 added to the sheeting for an air backed embodiment of the invention.

The material with air spheres has a much greater whiteness (Cap Y value)[1] as can be seen from the comparative data in the following Tables I and II taken from samples of the type shown in FIG. 5 with material 12 provided as an air backing for the sheeting 54.

[1] The Cap Y value is measured on a Minolta Colorimeter which projects a standard light illuminant onto the sample at a 45° angle and detects the reflected light from the sample surface at a 45° angle with a detector oriented opposite the light source. Readings are made every 45° and the sample is rotated through 360° while lying flat on a solid surface.

TABLE I

Cap Y without air spheres
(Polyester with acrylated epoxy prisms 330 Tooling)

| Orientation Angle | CAP Y |
|---|---|
| 0 | 30.93 |
| 45 | 31.17 |
| 90 | 34.38 |
| 135 | 32.08 |
| 180 | 30.78 |
| 225 | 31.17 |
| 270 | 35.81 |
| 315 | 31.41 |
| Average | 32.22 |

TABLE II

Cap Y with air spheres
(Polyester with acrylated epoxy prisms 330 Tooling)

| Orientation Angle | CAP Y |
|---|---|
| 0 | 46.02 |
| 45 | 45.58 |
| 90 | 47.77 |
| 135 | 45.77 |
| 180 | 45.94 |
| 225 | 46.51 |
| 270 | 48.25 |
| 315 | 45.68 |
| Average | 46.44 |

Note: The data in Table II indicates an approximately 14.0 point gain in Cap Y or a 44% gain over that of Table I. The higher the Cap Y, the greater the whiteness appearance of the material. A low Cap Y material is gray in appearance.

Cap Y tests were also conducted on two metallized samples of the type shown with aluminum coating 14 on the prism faces 15 with the following results:

TABLE III

Cap Y without air spheres
(Vinyl with acrylated urethane prisms 330 Tooling)

| Orientation Angle | CAP Y |
|---|---|
| 0 | 7.89 |
| 45 | 8.66 |
| 90 | 9.88 |
| 135 | 7.51 |
| 180 | 7.81 |
| 225 | 8.93 |
| 270 | 9.53 |
| 315 | 7.51 |
| Average | 8.47 |

TABLE IV

Cap Y with air spheres
(Vinyl with acrylated urethane prisms 330 Tooling)

| Orientation Angle | CAP Y |
|---|---|
| 0 | 25.35 |
| 45 | 26.07 |
| 90 | 27.48 |
| 135 | 25.84 |
| 180 | 25.63 |
| 225 | 25.86 |
| 270 | 27.62 |
| 315 | 26.07 |
| Average | 26.24 |

In this example, Table IV Cap Y increases by approximately 17.50 points, which represents a 300% gain in Cap Y over that of Table III. The reasons, we believe, for the Cap Y increase is illustrated in the simplified one-dimensional schematic of FIG. 7, which shows how the light that is incident on a microprism retroreflector 70 reflects and refracts depending on the path of the light through the prism.

Figure 6:
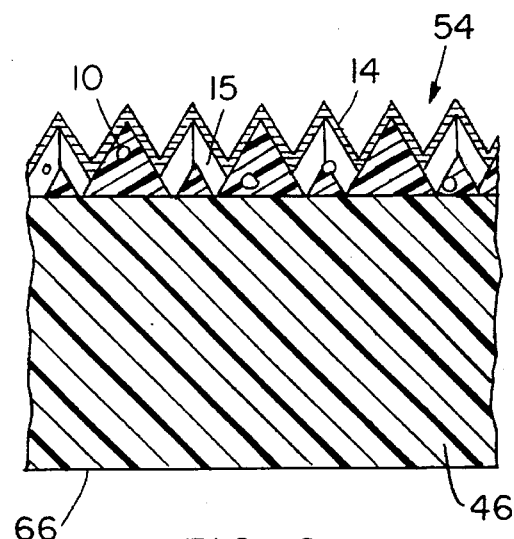
FIG. 6 is a view as in FIG. 4 with a metallic reflective layer 14 added for a metal reflector embodiment of the invention.
Figure 7:
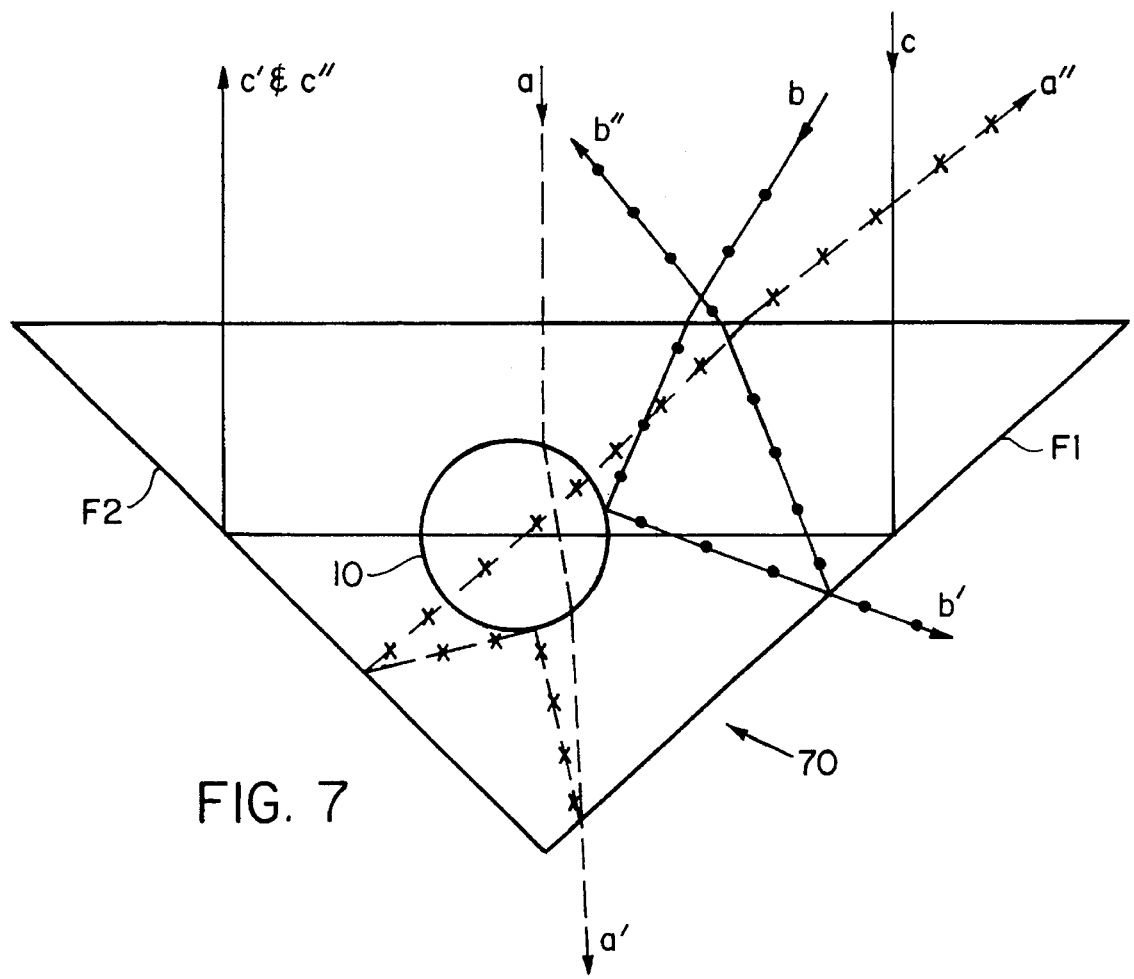
FIG. 7 is a schematic ray-tracing drawing to illustrate certain principles of the invention.

Ray "a" is incident normal to the prism window face and travels the path shown in "dashes" through the prism 70. If the reflecting faces F1,F2 of the prism are not metallized, ray "a" will exit the prism as ray a' and then reflect in a diffuse manner off of the white backing 12 (shown in FIG. 5) normally used for retroreflective air backed construction. If the reflecting faces of the prism are metallized with a layer 14 of metal, such as silver or aluminum) as shown in FIG. 6, the ray will follow the longer path (shown by "dashed X's.") through the prism and the air bubble 10 and exit the prism window as ray a".

Ray "b" (shown in "dotted" lines) which enters the prism window at an angle will follow an entirely different path through the prism. When ray "b" reaches the air sphere 10, its angle of incidence at the surface of the air sphere is greater than the critical angle of 41.8° (this is the critical angle assuming the index of refraction of the prism material for a cube corner prism is 1.5 and the air inside the air sphere has an index of refraction of 1.0) and the ray is totally internally reflected. When ray "b" reaches the reflecting face of the prism, it will exit the prism as ray b' if the face is air backed. If the face is metallized, ray "b" will follow the longer path shown and exit the prism as b".

Ray "c" (shown in "solid" lines) is totally internally reflected from the prism faces and follows an undeviated path through the air sphere to emerge as rays c' or c". Ray "c" will have the same path through the prism and air sphere independent of the coating on the prism reflecting faces.

It can be seen from the above described ray diagrams that the cumulative effect will be that some light will be retroreflected by a prism containing an air sphere and some light will be redirected to either:

a) Widen the retroreflected light pattern—This would be the case for rays that enter the face parallel to and slightly to either side of ray "c". When these rays emerge from the prism, they will be diverging to either side of the direction of the rays c' and c"; or b) Increase the Cap Y or whiteness value of the material—Rays "a" and "b" exit the prism in a direction that will increase the Cap Y value of airbacked prisms as in the case of rays a' and b', or of metallized prisms, as in the case of rays a" and b". Rays a' and b' are diffusely reflected from a White backing material to increase Cap Y. Rays a" and b" reflect out of the prism after only one or two reflections from the metallized faces of the prism and create a higher Cap Y or whiter appearance of the material.

Based upon the above examples, one can see that there are an infinite number of ray paths through corner cube microprisms containing air spheres within the prism. In practice, we find the air spheres to be random in size and location with most of the air spheres near the volumetric center of the corner cube. But, we have also seen corner cubes which contain two air spheres within the same cube and air spheres which are substantially offset from the center of the corner cubes.

The air spheres 10 have a beneficial effect on the retroreflected light pattern, light rays that would normally be retroreflected in a normal condensed diffraction pattern (that is, the only divergence created is due to the diffraction which occurs at the small exit aperture of the microprism) are redirected to wider observation angles and also orientation angles which are normally low in brightness. This beneficial effect is true for metallized prisms, but apparently not for all air backed prisms, as is shown in the representative data given in Tables V–VII below:

TABLE V

Al Metallized RP1.1 Prisms, Polyester Top Film, 330 Tooling (% SIA Variation from 0° to 165° of Rotation)

| Obs. Angle | Entr. Angle | With Airspheres | Without Airspheres | Δ % |
|---|---|---|---|---|
| 0.10° | 5° | 4 | 5 | −1 |
|  | 10 | 6 | 11 | −5 |
|  | 20 | 10 | 30 | −20 |
|  | 30 | 11 | 55 | −44 |
|  | 40 | 34 | 42 | −8 |
|  | 45 | 63 | 84 | −21 |
|  | 50 | 85 | 104 | −19 |
|  | 60 | 866 | 650 | +216 |

The only increase in SIA variation is at the 60° entrance angle. (Bob—What is SIA variation?)

TABLE VI

Al Metallized RP1.1 Prisms, Polyester Top Film, 330 Tooling (% SIA Variation from 0° to 165° of Rotation)

| Obs. Angle | Entr. Angle | With Airspheres | Without Airspheres | Δ % |
|---|---|---|---|---|
| 0.33° | 5° | 69 | 113 | −44 |
|  | 10 | 72 | 159 | −87 |
|  | 20 | 93 | 117 | −24 |
|  | 30 | 65 | 62 | +3 |
|  | 40 | 55 | 51 | +4 |
|  | 45 | 63 | 50 | +13 |
|  | 50 | 93 | 57 | +36 |
|  | 60 | 583 | 535 | +48 |
| 1.50° | 5 | 288 | 500 | −212 |
|  | 10 | 312 | 500 | −188 |
|  | 20 | 300 | 475 | −175 |
|  | 30 | 183 | 350 | −167 |
|  | 40 | 183 | 400 | −217 |
|  | 45 | 125 | 166 | −41 |
|  | 50 | 167 | 250 | −83 |
|  | 60 | 600 | 450 | +150 |

The above data in Table VI shows that most of the improvement at 0.33° observation angle is at entrance angles less than 30 degrees and the improvement at a 1.50° observation angle is at all entrance angles except at a 60° entrance angle.

The SIA (cd/lux/m$^2$) level drops for most geometries especially at narrow observation angles.

TABLE VII

Airbacked, Vinyl, SRV35.11 Prisms

| Obs. Angle | Entr. Angle | With Airspheres | Without Airspheres | Δ % |
|---|---|---|---|---|
| 0.1° | 5° | 5 | 5 | 0 |
|  | 10 | 6 | 5 | +1 |
|  | 20 | 25 | 11 | +14 |
|  | 30 | 337 | 289 | +48 |
|  | 40 | 631 | 602 | +29 |
|  | 45 | 650 | 491 | +159 |
|  | 50 | 490 | 500 | −19 |
|  | 60 | 6200 | 6700 | −500 |
| 0.33 | 5 | 112 | 42 | +70 |
|  | 10 | 102 | 40 | +62 |

TABLE VII-continued

Airbacked, Vinyl, SRV35.11 Prisms

| Obs. Angle | Entr. Angle | With Airspheres | Without Airspheres | Δ % |
|---|---|---|---|---|
|  | 20 | 78 | 37 | +41 |
|  | 30 | 560 | 372 | +188 |
|  | 40 | 1012 | 972 | +40 |
|  | 45 | 1027 | 990 | +37 |
|  | 50 | 800 | 525 | +275 |
|  | 60 | 5450 | 5600 | −150 |
| 1.50 | 5 | 215 | 73 | +142 |
|  | 10 | 186 | 76 | +110 |
|  | 20 | 50 | 44 | +6 |
|  | 30 | 533 | 275 | +258 |
|  | 40 | 550 | 633 | −83 |
|  | 45 | 1500 | 550 | +950 |
|  | 50 | 2700 | 2100 | +600 |
|  | 60 | 19900 | 6800 | +13100 |

The above data in Table VII shows that for most geometries, the variation from 0° to 165° orientation in brightness increases. That is the material becomes more orientation sensitive when air spheres are introduced. The airbacked product construction creates the opposite effect when compared to the metallized product when air spheres are introduced.

The airbacked product with air spheres had, in general, lower SIA values than equivalent material without air spheres.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. Retroreflective sheeting comprising an array of retroreflective prisms formed on a base body with air spheres encapsulated in the prisms.

2. The sheeting of claim 1 in which the spheres are randomly formed in the prisms during lamination of the base body to the prisms.

3. The sheetings of claim 1 including metallization formed on said formations.

4. The sheeting of claim 1 including a white backing material on said formations forming an air space between said backing and said formations.

5. An article of clothing containing an exposed array of retroreflective prisms with air spheres encapsulated therein.

6. A sign formed of retroreflective sheeting containing an array of retroreflective prisms with air spheres encapsulated therein.

7. A method of forming retroreflective sheeting comprising the steps of:

a) partially filling a mold having cavities in the form of a closely packed array of cube corner prisms formed therein, with a prism forming material, leaving air spaces in said cavities; and b) applying a base body to said mold while curing the material to form retroreflective prism sheeting with air spheres entrapped in the prisms.

8. In a method for making retroreflective composite sheeting, the steps comprising:

a) depositing a hardenable molding material upon a mold surface having an array of minute, contiguous cube-corner recesses therein, without completely filling said recesses;

b) applying a flexible film-like sheet material to said molding material on said mold surface under sufficient pressure to effect intimate surface contact therebetween, thereby forming pockets of air in said molding material;

c) subjecting said molding material to conditions sufficient to effect substantial solidification thereof and bonding thereof to the adjacent surface of said sheet material to form a composite structure with air pockets entrained therewith; and d) removing said composite structure from said mold surface to provide retroreflective sheeting comprising a body portion provided by said preformed sheet material which presents a substantially smooth front surface, and a multiplicity of minute cube-corner formations corresponding to said recesses with air pockets formed therein, so that the light rays entering said sheeting through a front surface of said body portion predominantly pass through and into said cube-corner formations, by which they are reflected back through the body portion along a variety of paths depending upon whether they encounter said air pockets.

9. The method of claim 8 including the additional step of uniformly distributing the hardenable molding material over said molding surface, said distributing step being effected simultaneously with said sheet material-applying step by introducing said molding material and sheet material in an appropriate superimposed relationship into a nip of substantially fixed spacing formed between said molding surface and an adjacent member cooperating therewith.

10. The method of claim 8 wherein said molding material is a molten synthetic resin and the solidification thereof is accomplished at least in part by cooling.

11. The method of claim 8 additionally including the step of depositing a reflective coating on said cube-corner formations after removal of said composite structure from said mold surface.

12. The method of claim 8 additionally including the steps of forming a white reflective layer on said formations with an air space therebetween.

13. Retroreflective sheeting comprising:

a sheet of flexible film-like material bonded to a multiplicity of minute solid cube-corner formulations with air pockets formed therein such that light rays entering said sheeting through a front surface of said sheet predominantly pass through and into said cube-corner formations by which they are reflected back through the sheet along a variety of paths depending upon whether they encounter said air pockets; whereby the number of reflections of same rays may be less than the number of reflections which would have occurred in the absence of said air pockets.

14. In a method for making retroreflective composite sheeting, the steps comprising:

a) depositing a hardenable molding material upon a moving mold surface having an array of minute, contiguous cube-corner recesses therein, each of said recesses having a maximum side edge dimension of less than about 0.025 inch, said molding material being a transparent, fluid formulation, without completely filling said recesses;

b) applying a flexible film-like sheet of transparent material to said molding material on said mold surface under sufficient pressure to effect intimate surface contact therebetween, thereby forming pockets of air in said molding material;

c) subjecting said molding material to conditions sufficient to effect substantial solidification thereof and bonding thereof to the adjacent surface of said sheet material to form a composite structure with air pockets entrained therewith; and d) removing said composite structure from said mold surface to provide retroreflective sheeting comprising a body portion provided by said preformed sheet material which presents a substantially smooth front surface, and a multiplicity of minute cube-corner formations corresponding to said recesses with air pockets, so that the light rays entering said sheeting through a front surface of said body portion predominantly pass through and into said cube-corner formations, by which they are reflected back through the body portion along a variety of paths depending upon whether they encounter said air pockets.

15. The method of claim 14 additionally including the step of depositing a reflective coating on the faces of said cube-corner formations after removal of said composite structure from said mold surface.

16. There method of claim 14 additionally including the step of forming a white reflective layer on said formation leaving an air space therebetween.

* * * * *